United States Patent [19]
Johnson

[11] Patent Number: 5,101,306
[45] Date of Patent: Mar. 31, 1992

[54] RELEASABLE CONTROLLED FORCE CLAMP FOR DISK STORAGE APPARATUS

[75] Inventor: James L. Johnson, San Jose, Calif.

[73] Assignee: Kabushiki Kaisha Toshiba, Kanagawa, Japan

[21] Appl. No.: 664,862

[22] Filed: Mar. 5, 1991

Related U.S. Application Data

[63] Continuation-in-part of Ser. No. 428,848, Oct. 30, 1989.

[51] Int. Cl.$^5$ .............................................. G11B 17/02
[52] U.S. Cl. ............................ 360/98.08; 360/99.12; 369/270
[58] Field of Search ............... 360/98.01, 98.02, 98.07, 360/98.08, 99.05, 99.12, 99.04; 369/270, 271

[56] References Cited

U.S. PATENT DOCUMENTS 4,918,545   4/1990   Scheffel ............................ 360/90.08

OTHER PUBLICATIONS

Disk Pack Clamping Ring, IBM Technical Disclosure Bulletin, vol. 28, No. 11, Apr. 1986 Reinforced Circular Push-On publication, Truarc Retaining Rings Division.

*Primary Examiner*—David J. Severin
*Attorney, Agent, or Firm*—Limbach & Limbach

[57] ABSTRACT

A clamp secures disks to a hub through means of a push-on retaining ring which is engaged with a grip ring received in an annular groove extending around the hub. The grip ring is split and expansible to enable it to be engaged with, or removed from, the groove. Spaced detent grooves are formed in the external surface of the grip ring to provide different positions at which the retaining ring may be engaged with the grip ring to alter the degree of compression imparted to the disks by the retaining ring. The retaining ring may be pushed fully past the grip ring to release the clamp. An installation and release fixture is provided to selectively move the retaining ring over the grip ring.

23 Claims, 4 Drawing Sheets

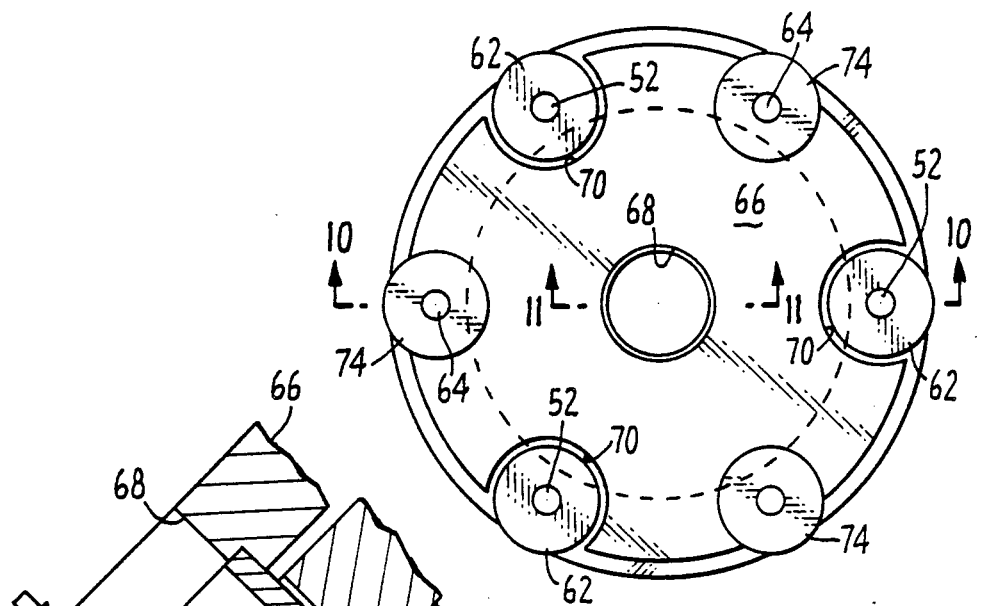
FIG. 9.
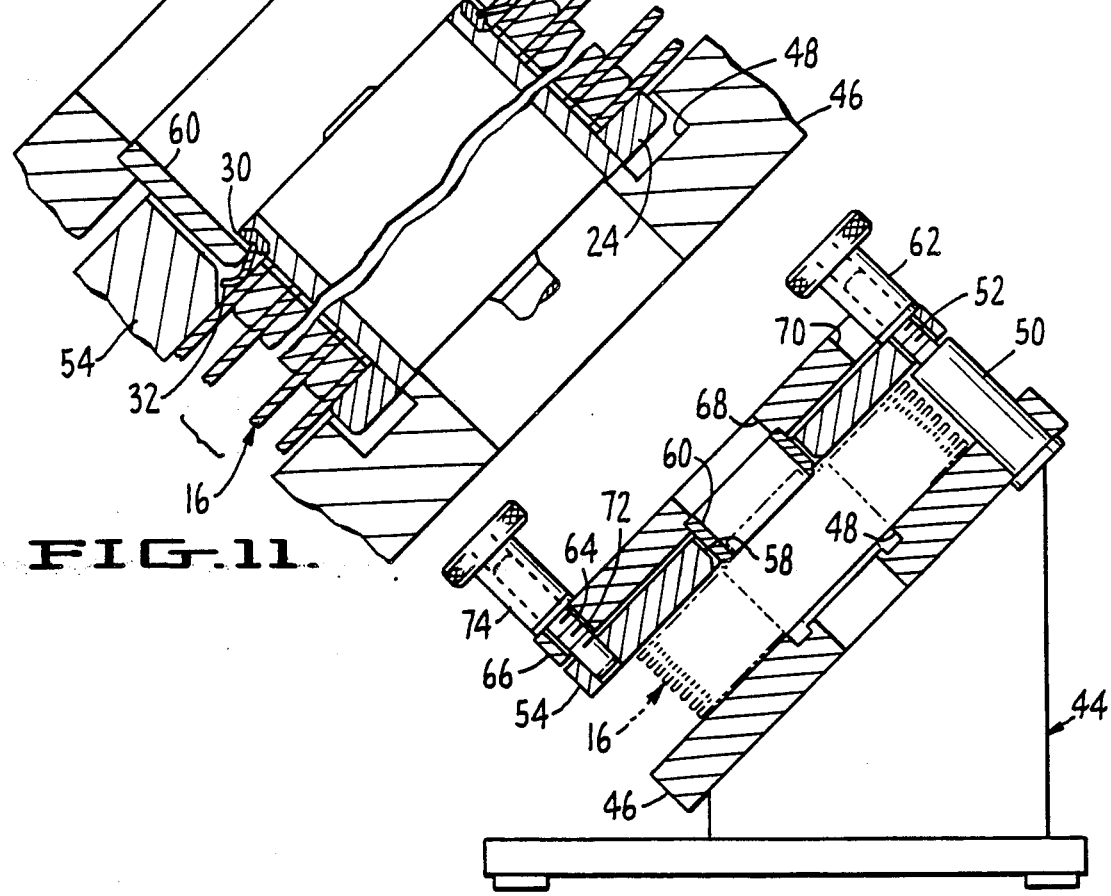
FIG. 11.
FIG. 10.

RELEASABLE CONTROLLED FORCE CLAMP FOR DISK STORAGE APPARATUS

RELATED APPLICATION

This is a continuation-in-part of U.S. Patent application Ser. No. 07/428,848, filed Oct. 30, 1989, entitled AN IMPROVED CLAMP FOR A DISK STORAGE APPARATUS.

TECHNICAL FIELD

The present invention relates to a retaining clamp to clamp a plurality of data storage disks to a rotatable spindle hub in a disk drive. The improved retaining clamp supplies substantially uniform force to the data storage disks and can be easily removed and applied with a minimal amount of contamination to the data disks. In its more specific aspects, the invention is concerned with a clamp which has three positions: one for loose clamping for balancing; one for full clamping during disk operation; and one for full release.

BACKGROUND OF THE INVENTION

Direct Access Storage Devices (DASD), such as disk drives are well known in the art. A typical prior art disk storage apparatus has one or more data storage disks mounted on a hub and a motor to rotate the hub. An example of such an apparatus and a clamp which may be used to secure the disks to the hub is shown in U.S. Pat. No. 4,918,545.

When glass is used for the substrate of the storage disks, it is important to retain and hold the disks in place such that the glass will not slip, warp or break. In addition, the force applied to the disks should be controlled so as not to be so high that it will break the glass, nor be so low as to permit the disks to slip under shock and vibration. The clamping force must be constant, or nearly so, with dimensional changes experienced under temperature variations.

It is also desirable to have a clamping arrangement for the disks which enables some relative movement between the disks and hub for balancing, and also provides for secure mounting of the disks to the hub during operation of the DASD. Ideally, the clamp should also be readily releasable to permit rework of the disk stack.

The prior art teaches push-on retaining rings for securing elements to shafts. These rings are fabricated of tempered metal and include inwardly directed radially extending teeth which engage the shaft. They are widely used in automobiles and agricultural equipment and purchasable from, for example, Walds Truarch. Applicant's prior patent application Ser. No. 07/428,848 teaches a new clamp wherein such rings are used for securing data storage disks to a hub.

SUMMARY OF THE INVENTION

The present invention is directed to an improved clamp for retaining a plurality of data storage disks on the rotatable spindle hub of a disk drive through means of a resilient push-on retaining ring. The clamp comprises a grip ring proportioned for receipt around the hub and locating means to position the grip ring at a preselected axial position relative to the hub. The push-on retaining ring is proportioned for receipt around the grip ring and interengagable means on the grip and retaining rings are provided to secure the retaining ring in at least one preselected position relative to the grip ring.

In the preferred embodiment, the grip ring takes the form of a split ring which is expansible to enable it to be slid around the hub and the locating means takes the form of a groove formed around the hub for complemental receipt of the grip ring. The interengagable means in this embodiment comprise a groove formed in the exterior of the grip ring and inwardly directed radial teeth on the retaining ring engagable with the groove. When the grip ring and retaining ring are interengaged, the retaining ring serves to both secure the grip ring against removal from the groove in the hub and to impart axial clamping force to the disks received on the hub.

A principal object of the invention is to provide a clamp which applies uniform axial force to a disk pack received on the spindle hub of a disk drive.

Another object of the invention is to provide such a clamp where the clamping force may be selectively altered to accommodate both balancing of the disk pack and operation of the pack in a DASD.

Yet another object of the invention is to provide such a clamp which may be readily and easily released for reworking of the disk pack.

Still another and more specific object of the invention is to provide such a clamp having two stages of clamping force, one for loose clamping of the disks for balancing and the other for secure clamping during disk drive operation.

A further object of the invention is to provide such a clamp employing a resilient retaining ring which may be both installed and released by the application of axial compressive forces thereto.

Still another object related to the latter object is to provide such a clamp wherein the axial compressive forces for installation and release are applied in the same direction Another object is to provide a fixture for holding a disk pack and applying controlled axial force to the clamp of the present invention for both installation and release of the clamp.

These and other objects will become more apparent when viewed in light of the following detailed description and accompanying drawings.

BRIEF DESCRIPTION OF THE DRAWINGS

FIG. 9 is a top plan view of the fixture of the present invention, as it would appear when applying axial compressive force to the retaining ring of the inventive clamp;

FIG. 10 is a cross-sectional elevational view of the fixture, taken on the plane designated by line 10—10 of FIG. 9;

FIG. 11 is a cross-sectional elevational view similar to FIG. 10, taken on the plane designated by line 11—11 of FIG. 9, and enlarged to show the operation of the fixture in applying axial compressive force to the retaining ring of the clamp; and, FIG. 12 is an exploded perspective view of the clamp applying fixture of the present invention, without a disk stack in place.

DESCRIPTION OF THE PREFERRED EMBODIMENTS

Figure 1:
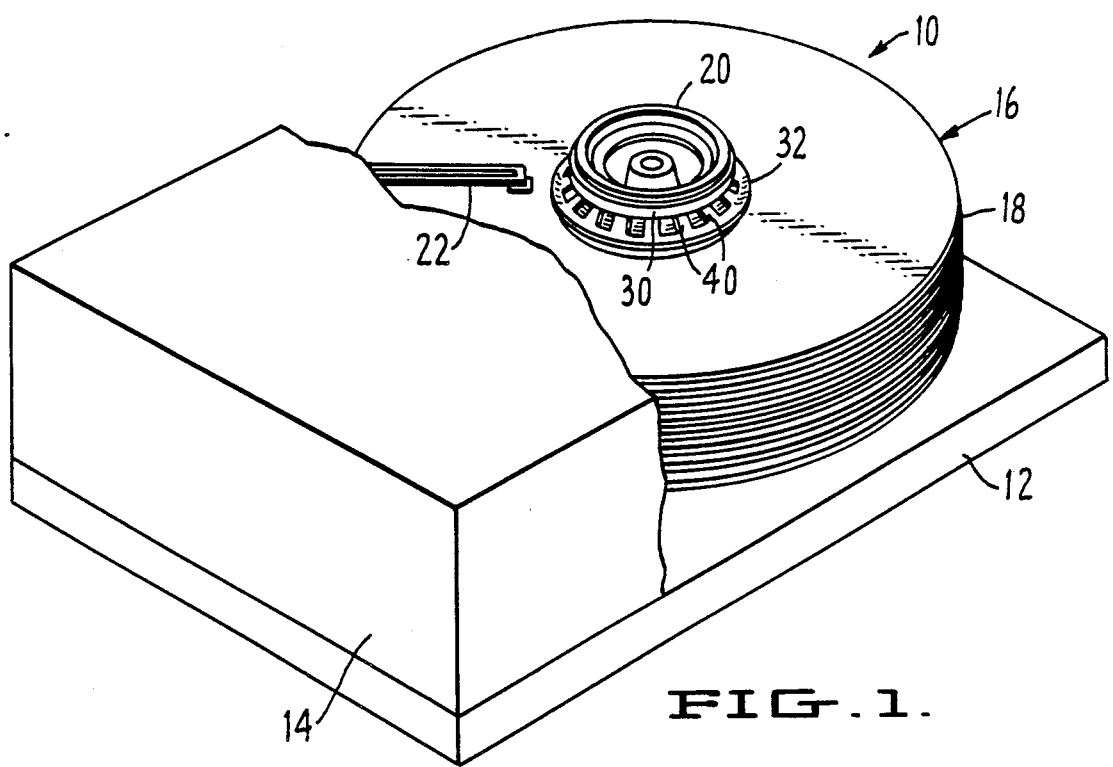
FIG. 1 is perspective view of a DASD embodying the clamp of the present invention, with the cover of the device broken away to expose the clamp and the disk pack being held in place.

Referring now to FIG. 1, there is shown a disk storage apparatus 10 having a base 12 and a cover 14 (shown broken away to illustrate the interior of the apparatus). Mounted on the base 12 is a disk pack 16 comprised of a plurality of storage disks 18 concentrically received around a spindle hub 20. The disks are ganged for rotation by the hub. The drive mechanism may be of the type disclosed in applicant's copending application Ser. No. 07/428,848. A transducer head assembly 22 is shown extending over the topmost disk 18.

Figure 2:
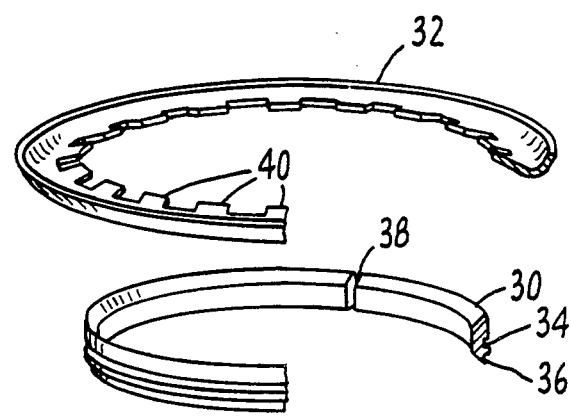
FIG. 2 is an exploded perspective view of the disk pack and clamp, showing the grip and retaining rings removed from the drive spindle hub.
Figure 2:
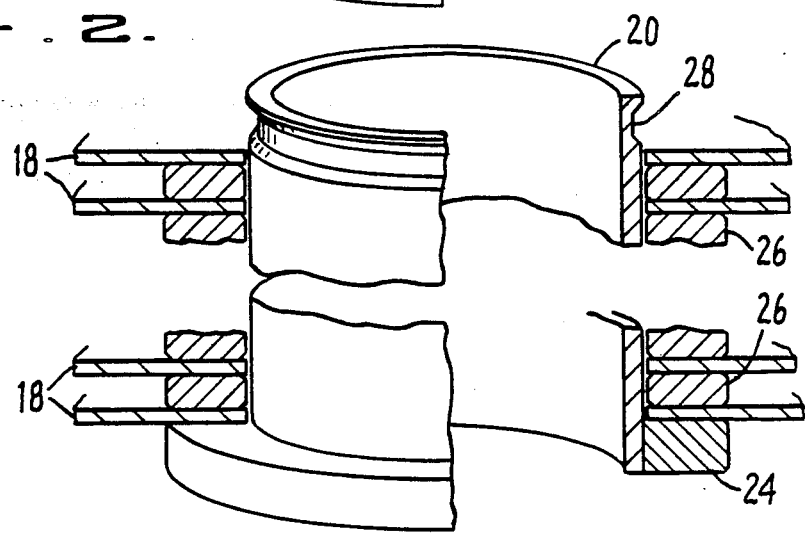

FIG. 2 illustrates the manner in which the disks 18 are mounted on the hub 20. As there shown, it will be seen that the hub 20 has a collar 24 fixed to and extending around its lower end. The lower most disk 18 rests on the collar. Each successive disk is spaced from the disk immediately therebelow by an annular spacer 26. The disks and spacers are axially slidable over the hub. The tolerance between the spacers and the hub is sufficiently small to center the spacers on the hub.

As shown in FIG. 2, the upper end of the hub 20 extends beyond the uppermost disk 18. An annular locating groove 28 extends around the upper end of the hub in spaced relationship to the uppermost disk 18. The groove has an open trapezoidal cross-section, as may be seen to the righthand side of FIG. 2.

The clamp of the present invention comprises: the annular groove 28; a split annular grip ring 30 proportioned for complemental engagement in the groove 28; and, a resilient push-on retaining ring 32 engagable with the outside surface of the grip ring 30. The grip ring is hardened material, such as PH-17 stainless. The interior side of the ring is of a trapezoidal shape complemental with the groove 28. The exterior of the ring 30 has first and second annular detent grooves 34 and 36, respectively, formed therearound in axially spaced relationship to one another. The retaining ring 32 is a commercially available part of conventional design and is available from companies such as Walds Truarc. Such rings are commonly used in automotive and agriculture equipment to secure elements to shafts.

The grip ring 30 is resilient and, in the relaxed condition, of an internal diameter proportioned for snug complemental engagement in the groove 28. The split, designated 38, in the ring enables the ring to be sprung open for passage over the hub 20 during installation and removal of the ring. The retaining ring 32 has inwardly directed radially extending teeth 40 which define the interior diameter of the ring. These teeth are resiliently deflectable to enable the ring 32 to be engaged over the ring 30. The grooves 34 and 36 are proportioned for receipt of the teeth 40 and provide detents whereby the retaining ring may be selectively engaged with the grip ring at two axially spaced positions.

Figure 3:
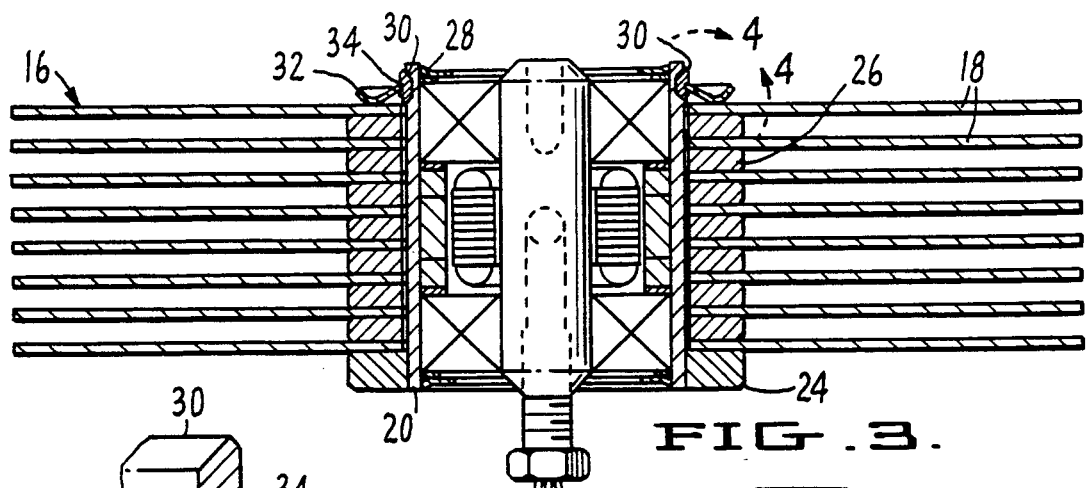
FIG. 3 is a cross-sectional elevational view of a disk pack held in place by the clamp of the present invention.

FIG. 3 shows the spindle hub with the disk pack assembled therearound and the clamp of the present invention in place with the retaining ring 32 engaged in the first detent groove 34 of the grip ring 30. As there shown, the ring 30 is engaged in the groove 28 and serves to retain the grip ring 30 against removal from the groove 28 and to exert axial pressure on the disk pack through the uppermost disk 18.

Figure 4:
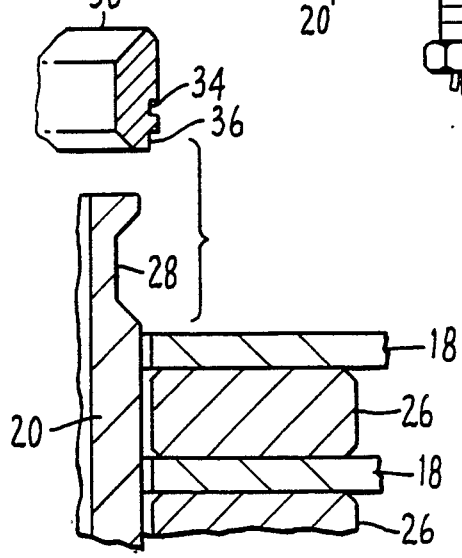
FIG. 4 is an exploded cross-sectional elevational view, taken on the plane designated by line 4—4 of FIG. 3, illustrating the first step of applying the clamp of the present invention, with the grip ring about to be engaged in the groove therefor provided in the spindle hub.
Figure 5:
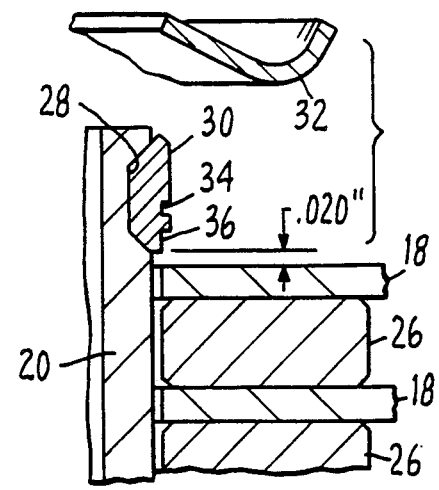
FIG. 5 is an exploded cross-sectional elevational view similar to FIG. 4, illustrating the second step of applying the clamp of the present invention, with the grip ring engaged in the groove therefor provided in the spindle hub and the retaining ring about to be engaged with the grip ring.
Figure 6:
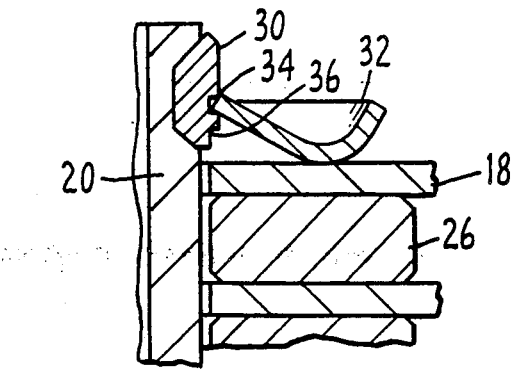
FIG. 6 is a cross-sectional elevational view similar to FIG. 4, illustrating the third step of applying the clamp of the present invention, with the retaining ring engaged in the first detent groove provided therefor in the grip ring, as it would be to condition the disk pack for balancing.
Figure 7:
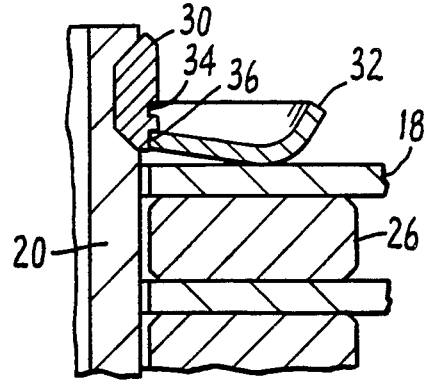
FIG. 7 is a cross-sectional elevational view similar to FIG. 4, illustrating the fourth and final step of applying the clamp of the present invention, with the retaining ring engaged in the second detent groove provided therefor in the grip ring.

FIGS. 4, 5, 6 and 7 show the successive steps used to install the clamp. In FIG. 4, the disk pack is shown in place on the hub and the grip ring 30 is about to be placed in the groove 28. FIG. 5 shows the grip ring 30 in place within the groove 28 and the retaining ring 32 about to be engaged around the grip ring. From this figure, it will be seen that the lower edge of the grip ring 34 is spaced from the top surface of the uppermost disk 18. This spacing is slightly greater than the thickness of the teeth 40 of the retaining ring and typically measures about 0.020 inches. In FIG. 6, the retaining ring 32 is shown engaged in the first groove 34 of the grip ring 32. This is the condition shown in FIG. 3 where the first (lower) degree of axial force is exerted on the disk pack so that the disks within the pack are somewhat loose for balancing. After the step of FIG. 6, and before that of FIG. 7, the disk pack assembly would be dynamically balanced. FIG. 7 shows the retaining ring 32 in the final clamping condition engaged with the groove 36 for optimal clamping of the disk pack during operation of the DASD in which the pack is designed to be used.

Figure 8:
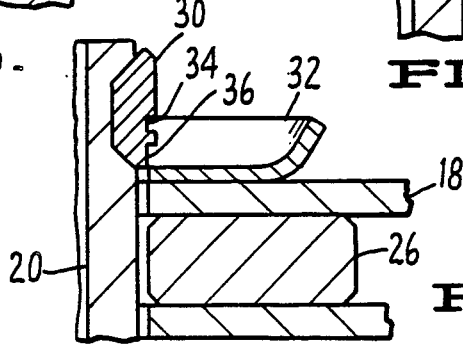
FIG. 8 is a cross-sectional elevational view similar to FIG. 4, illustrating the step of forcing the retaining ring past the grip ring for release of the clamp.
Figure 12:
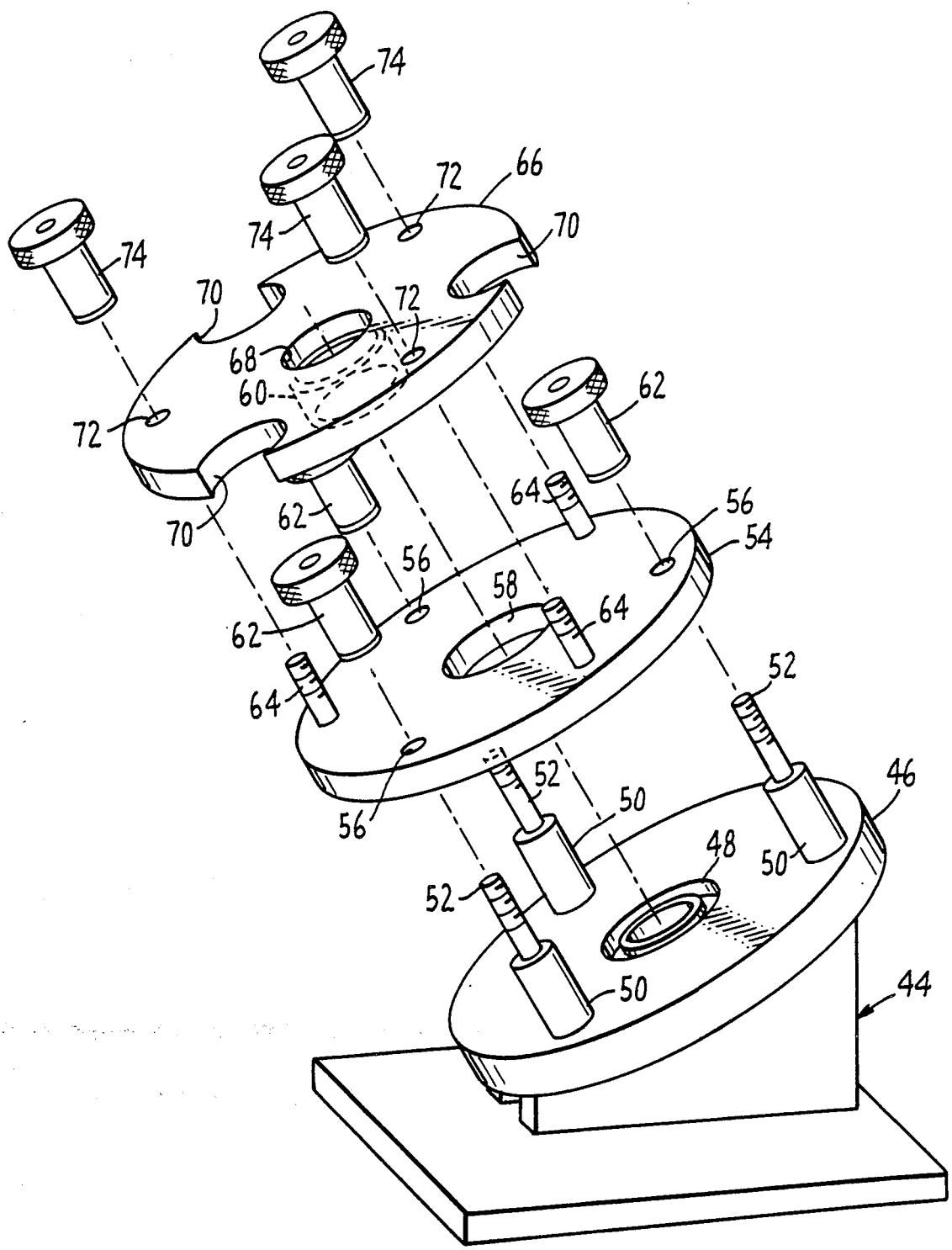

FIG. 8 shows the retaining ring 32 pushed beyond the lower extremity of the grip ring 30. This functions to release the clamp and condition the disk pack for reworking, if necessary. With the clamp conditioned as shown in FIG. 8, the grip ring 30 may be easily removed from the groove 28 and then the retaining ring 32 may be removed from the hub 20.

INSTALLATION AND RELEASE FIXTURE

FIGS. 9 to 12 show the fixture which may be used to facilitate assembly of a disk pack and installation and removal of the inventive clamp. As may best been seen from FIG. 12, the components of the fixture comprise: a base 44 having an inclined platform 46 fixed thereto, which platform has a central recess 48 proportioned for receipt of the collar 24; three disk location posts 50 fixed to and extending from the platform 46, said posts having threaded studs 52 extending therefrom and being so spaced as to maintain a disk 18 received therebetween in centered alignment with the recess 48; a retaining plate 54 having bores 56 formed therethrough for slidable receipt of the studs 52 and a central opening 58 of a diameter larger than the outer diameter of the hub 20; an insert ring 60 (see FIGS. 10 and 11) proportioned for movement through the opening 58 and around the hub 20, and engagement with a retaining ring 32 received around the hub; thumb nuts 62 threadably engagable with the studs 52 to secure the retaining plate 54 to the posts 50; studs 64 fixed to and extending from the plate 54 at equally spaced positions around the opening 58; clamp plate 66 having a central opening 68 carrying the insert ring 60, arcuate cutouts 70 to accommodate the thumb nuts 62 and through bores 72 through which the studs 64 may extend; and, thumb nuts 74 for threaded receipt on the studs 64 and engagement with the top surface of the plate 66.

The operational steps in using the fixture 42 to assemble a disk pack and install the inventive clamp, are as follows:

(1) Hub 20 is placed flange side down in the recess 48 (see FIG. 11).

(2) Disks 18 and spacers 26 are alternately placed on the hub 20. During this operation, the disks are centered by the posts 50 (see FIG. 10) and the spacers are centered as the result of the close tolerance between the hub and the spacers.

(3) Upon completion of stacking, the grip ring 30 is engaged in the groove 28 as shown in FIG. 5.

(4) Retaining ring 32 is placed over the top end of the hub 20.

(5) Retaining plate 54 is placed over the posts 50, with the studs 52 extending through the bores 56, and secured in place by the thumb nuts 62 to hold the disk pack in place with the retaining ring thereabove.

(6) Clamp plate 66 is positioned over the retaining plate 54, with the studs 64 extending through the through bores 72 and the insert ring 60 engaged with the top surface of the retaining ring 32.

(7) With the fixture conditioned as described above, the thumb nuts 74 are engaged on the studs 64 and incrementally tightened to carry out the clamping procedure, as follows:

(a) Clamp plate 66 is displaced to force the retaining ring teeth 40 to the first groove 34, as shown in FIG. 6 (This is to a level of "light clamping force" which allows displacement of the disks for balancing purposes, but is strong enough for spinning to correct for spindle hub imbalance.);

(b) The disk pack is removed from the fixture and installed in a balancing fixture for dynamic balancing; and, (c) After balancing, the disk pack is reinstalled in the fixture and the thumb nuts 74 are tightened to force the retaining ring to a position engaged with the second detent groove 36, as seen in FIG. 7 (This is the final hard clamp position).

If after the above procedure rework is necessary, the disk pack is again placed in the installation fixture and the thumb nuts 74 are tightened to press the retaining ring 32 past the grip ring 30. This releases the clamp, as seen in FIG. 8.

CONCLUSION

From the foregoing description, it will be seen that the present invention provides a clamp which provides uniform controlled clamping force on the disk pack and may be readily and easily removed for rework. It also provides two-stage clamping force: one for loose clamping for balancing and the other for secure clamping during operation of the disk pack in a DASD.

While preferred embodiments of the invention have been illustrated and described, it should be understood that the invention is not limited to the specifics of these embodiments, but rather is defined by the accompanying claims.

I claim:

1. A clamp for securing disks around a hub under axial compression, said clamp comprising:
   (a) a grip ring proportioned for receipt around the hub;
   (b) locating means to position the grip ring at a preselected axial position relative to the hub;
   (c) a push-on retaining ring proportioned for receipt around the grip ring; and,
   (d) interengagable means on the grip and retaining rings engagable to secure the retaining ring in at least one preselected position relative to the grip ring.

2. A clamp according to claim 1 wherein the interengagable means comprises:
   (a) an externally disposed groove formed in the grip ring; and,
   (b) at least one resilient tooth formed on and extending internally of the retaining ring for engagement with the groove in the grip ring.

3. A clamp according to claim 1 wherein the interengagable means comprises:
   (a) a plurality of externally disposed axially spaced grooves formed in the grip ring; and,
   (b) at least one resilient tooth formed on and extending internally of the retaining ring, said at least one tooth being selectively engageable with the respective grooves formed in the grip ring to secure the retaining ring at different axial positions relative to the grip ring.

4. A clamp according to claim 1 wherein the locating means comprises:
   (a) a groove formed on the hub; and,
   (b) an internal surface formed on the grip ring for complemental engagement with the groove.

5. A clamp according to claim 4 wherein:
   (a) the grip ring is split so that it may be contracted into engagement with the groove and expanded out of engagement with the groove; and,
   (b) when engaged, the interengagable means secure the grip ring against expansion and disengagement from the groove.

6. A clamp according to claim 1 wherein:
   (a) the locating means positions the grip ring in spaced relationship to the disks; and,
   (b) the retaining ring may be moved toward the disks to disengage the interengagable means.

7. A clamp according to claim 6, wherein:
   (a) the retaining ring has resilient inwardly directed teeth engageable with the grip ring, said teeth defining a given internal diameter; and,
   (b) at least a portion of the hub between the grip ring and disks has a cross-section less than said given diameter.

8. In a hub having disks received therearound, an improved method for securing the disks to the hub through means of a retaining ring having a plurality of spaced apart resilient teeth extending radially inwardly therefrom to define an internal diameter within the ring, said method comprising:
(a) providing an annular groove around the hub to one side of the disks;
(b) providing a split ring proportioned for receipt around the hub and complemental engagement with the groove, said ring having an external surface of a diameter slightly greater than the internal diameter within the retaining ring;
(c) disposing the split ring around the hub in engagement with the groove; and,
(d) disposing the retaining ring around the split ring with the teeth in engagement with the external surface of the split ring.

9. A method according to claim 8 further comprising providing an annular groove around the external surface of the split ring; and wherein engagement of the teeth with the external surface of the split ring is within said groove.

10. A method according to claim 8 wherein, after the disks are secured to the hub, the disks are released by forcing the retaining ring past the split ring to disengage the teeth from the external surface of split ring.

11. A method according to claim 8 further comprising providing a pair of spaced annular grooves around the external surface of the split ring; and wherein engagement of the teeth with the external surface of the split ring is first within one of said grooves and then within the other.

12. A method according to claim 11 wherein the groove first engaged by the teeth is spaced further from disks than the groove next engaged by the teeth.

13. A fixture for securing disks to a hub through means of a retaining ring having a plurality of spaced apart resilient teeth extending radially inwardly therefrom, said fixture comprising:
(a) a base member adapted to mount the hub;
(b) a retaining plate having an opening therein sufficiently large to permit the hub to pass therethrough;
(c) first means to mount the retaining plate to one side of the base member for receipt around a hub mounted on the base member and over the disks to be secured to the hub;
(d) a clamp plate having an opening therein sufficiently large to permit the hub to pass therethrough; and,
(e) second means to mount the clamp plate to the retaining plate for movement around a hub mounted on the base member and against a retaining ring disposed around the hub to force the retaining ring along the hub.

14. In combination with a hub having an assembly of stacked disks and spacers concentrically received therearound and extending radially therefrom, an improved clamp for securing the assembly to the hub under compression, said clamp comprising:
(a) a grip ring proportioned for receipt around the hub;
(b) locating means to position the grip ring relative to the hub to one side of the assembly;
(c) a push-on retaining ring proportioned for receipt around the grip ring; and,
(d) interengagable means on the grip and retaining rings engagable to secure the retaining ring in at least one preselected position relative to the grip ring.

15. In a combination according to claim 14, the improved clamp wherein the interengageable means comprises:
(a) an externally disposed groove formed in the grip ring; and,
(b) at least one resilient tooth formed on and extending internally of the retaining ring for engagement with the groove in the grip ring.

16. In a combination according to claim 14, the improved clamp wherein the interengageable means comprises:
(a) a plurality of externally disposed axially spaced grooves formed in the grip ring; and,
(b) at least one resilient tooth formed on and extending internally of the retaining ring, said tooth being selectively engageable with the respective grooves formed in the grip ring to secure the retaining ring at different axial positions relative to the grip ring to vary the degree of axial compression imparted to the assembly by the clamp.

17. In a combination according to claim 14, the improved clamp wherein the locating means comprises:
(a) a groove formed on the hub; and,
(b) an internal surface formed on the grip ring for complemental engagement with the groove.

18. In a combination according to claim 17, the improved clamp wherein:
(a) the grip ring is split so that it may be contracted into engagement with the groove and expanded out of engagement with the groove; and,
(b) when engaged, the interengagable means secure the grip ring against expansion and disengagement from the groove.

19. In a combination according to claim 14, the improved clamp wherein:
(a) the locating means positions the grip ring in spaced relationship to the assembly; and,
(b) the retaining ring may be moved toward the assembly to disengage the interengagable means and release the clamp.

20. In a combination according to claim 19, the improved clamp wherein:
(a) the retaining ring has resilient inwardly directed teeth engageable with the grip ring, said teeth defining a given internal diameter; and,
(b) at least a portion of the hub between the grip ring and assembly has a cross-section less than said given diameter.

21. A clamp for securing disks around a hub under axial compression, said clamp comprising:
(a) grip means on the hub to provide a shoulder thereon to one side of the disks;
(b) an annular groove formed around the shoulder; and,
(c) push-on retaining ring means proportioned for free slidable movement over the hub and gripping engagement with the annular groove formed around the shoulder, said ring means when in such engagement imparting axial compression to the disks.

22. A clamp according to claim 21 wherein:
(a) at least two axially spaced annular grooves are formed around the shoulder; and,
(b) the ring means is moveable over the shoulder for select engagement with either one or the other of said grooves to vary the amount of axial compression imparted to the disks by the ring means.

23. A clamp according to claim 21 wherein the shoulder provided by the grip means is axially spaced form the disks and the retaining ring means may be released by being pushed toward the disks and beyond the shoulder.

* * * * *